US012574103B2

(12) United States Patent
Kim et al.

(10) Patent No.: US 12,574,103 B2
(45) Date of Patent: Mar. 10, 2026

(54) PROXY DEVICE IN SATELLITE INTEGRATED TERRESTRIAL NETWORK AND OPERATION METHOD OF SAME

(71) Applicant: Samsung Electronics Co., Ltd., Suwon-si (KR)

(72) Inventors: Sunhyun Kim, Suwon-si (KR); Jungsoo Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 320 days.

(21) Appl. No.: 18/268,871

(22) PCT Filed: Dec. 20, 2021

(86) PCT No.: PCT/KR2021/019383
§ 371 (c)(1),
(2) Date: Jun. 21, 2023

(87) PCT Pub. No.: WO2022/139365
PCT Pub. Date: Jun. 30, 2022

(65) Prior Publication Data
US 2024/0080091 A1 Mar. 7, 2024

(30) Foreign Application Priority Data
Dec. 21, 2020 (KR) ........................ 10-2020-0179465

(51) Int. Cl.
*H04B 7/185* (2006.01)
*H04L 1/1812* (2023.01)
(Continued)

(52) U.S. Cl.
CPC ......... *H04B 7/1851* (2013.01); *H04L 1/1812* (2013.01); *H04W 80/06* (2013.01); *H04W 88/182* (2013.01)

(58) Field of Classification Search
CPC .. H04B 7/1851; H04B 7/185; H04B 7/18513; H04L 1/1812; H04W 88/182
See application file for complete search history.

(56) References Cited

U.S. PATENT DOCUMENTS 9,198,077 B2 * 11/2015 Park ........................ H04L 47/27
2010/0121957 A1 5/2010 Roy et al.
(Continued)

FOREIGN PATENT DOCUMENTS

CN 105392157 A 3/2016
JP WO2016/129271 A1 8/2016
(Continued)

OTHER PUBLICATIONS

3GPP "TSG RAN; NR; Solutions for NR to support non-terrestrial networks (NTN) (Release 16)," Jan. 16, 2020, 3GPP, 650 Route des Lucioles—Sophia Antipolis Valbonne—France.
(Continued)

*Primary Examiner* — Tuan H Nguyen
(74) *Attorney, Agent, or Firm* — Jefferson IP Law, LLP

(57) ABSTRACT

The present disclosure relates to a 5G or 6G communication system for supporting higher data transmission rates than 4G systems such as LTE. A method for operating a proxy in a wireless communication system combining a terrestrial network and a satellite network according to an embodiment of the present invention comprises the steps of: acquiring, from a server for managing a satellite, configuration information about a satellite cell that connects with a user equipment in which a transport control protocol (TCP) session is to be set up; calculating a first round trip time (RTT) between the satellite cell and the satellite and the data rate of the satellite cell on the basis of the configuration information about the satellite cell; and setting a congestion window (CWND)
(Continued)

value for the TCP session on the basis of the first RTT and
the data rate of the satellite cell.

15 Claims, 13 Drawing Sheets

(51) Int. Cl.
  *H04W 80/06*          (2009.01)
  *H04W 88/18*          (2009.01)

(56)                      References Cited

U.S. PATENT DOCUMENTS

| | | |
|---|---|---|
| 2011/0249559 A1 | 10/2011 | Sun et al. |
| 2014/0133306 A1 | 5/2014 | Park |
| 2015/0172406 A1 | 6/2015 | Hansen et al. |
| 2017/0273126 A1 | 9/2017 | Lim et al. |
| 2019/0320328 A1 | 10/2019 | Magzimof et al. |
| 2020/0053009 A1 | 2/2020 | Retnamony et al. |
| 2020/0396668 A1 * | 12/2020 | Muscariello .......... H04L 1/0017 |

FOREIGN PATENT DOCUMENTS

| | | |
|---|---|---|
| KR | 10-2009-0047767 A | 5/2009 |
| KR | 10-2011-0013817 A | 2/2011 |
| KR | 10-2014-0062999 A | 5/2014 |

OTHER PUBLICATIONS

International Search Report and written opinion dated Mar. 29,
2022, Issued In International Application No. PCT/KR2021/
019383.

* cited by examiner

PROXY DEVICE IN SATELLITE INTEGRATED TERRESTRIAL NETWORK AND OPERATION METHOD OF SAME

CROSS-REFERENCE TO RELATED APPLICATION(S)

This application is a U.S. National Stage application under 35 U.S.C. § 371 of an International application number PCT/KR2021/019383, filed on Dec. 15, 2021, which is based on and claims priority of a Korean patent application number 10-2020-0179465, filed on Dec. 21, 2020, in the Korean Intellectual Property Office, the entire disclosures of each of which is incorporated by reference herein in its entirety.

TECHNICAL FIELD

The disclosure relates to a technique for utilizing a proxy in a satellite-integrated terrestrial system.

BACKGROUND ART

A review of the development of mobile communication from generation to generation shows that the development has mostly been directed to technologies for services targeting humans, such as voice-based services, multimedia services, and data services. It is expected that connected devices which are exponentially increasing after commercialization of 5G communication systems will be connected to communication networks. Examples of things connected to networks may include vehicles, robots, drones, home appliances, displays, smart sensors connected to various infrastructures, construction machines, and factory equipment. Mobile devices are expected to evolve in various formfactors, such as augmented reality glasses, virtual reality headsets, and hologram devices. In order to provide various services by connecting hundreds of billions of devices and things in the 6G era, there have been ongoing efforts to develop improved 6G communication systems. For these reasons, 6G communication systems are referred to as Beyond-5G systems.

6G communication systems, which are expected to be implemented approximately by 2030, will have a maximum transmission rate of tera (1,000 giga)-level bps and a radio latency of 100 μsec, and thus will be 50 times as fast as 5G communication systems and have the ¹⁄₁₀ radio latency thereof.

In order to accomplish such a high data transmission rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, a technology capable of securing the signal transmission distance (that is, coverage) will become more crucial. It is necessary to develop, as major technologies for securing the coverage, multiantenna transmission technologies including radio frequency (RF) elements, antennas, novel waveforms having a better coverage than OFDM, beamforming and massive MIMO, full dimensional MIMO (FD-MIMO), array antennas, and large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the frequency efficiencies and system networks, the following technologies have been developed for 6G communication systems: a full-duplex technology for enabling an uplink (UE transmission) and a downlink (node B transmission) to simultaneously use the same frequency resource at the same time; a network technology for utilizing satellites, high-altitude platform stations (HAPS), and the like in an integrated manner; a network structure innovation technology for supporting mobile nodes B and the like and enabling network operation optimization and automation and the like; a dynamic spectrum sharing technology though collision avoidance based on spectrum use prediction, an artificial intelligence (AI)-based communication technology for implementing system optimization by using AI from the technology design step and internalizing end-to-end AI support functions; and a next-generation distributed computing technology for implementing a service having a complexity that exceeds the limit of UE computing ability by using super-high-performance communication and computing resources (mobile edge computing (MEC), clouds, and the like). In addition, attempts have been continuously made to further enhance connectivity between devices, further optimize networks, promote software implementation of network entities, and increase the openness of wireless communication through design of new protocols to be used in 6G communication systems, development of mechanisms for implementation of hardware-based security environments and secure use of data, and development of technologies for privacy maintenance methods.

It is expected that such research and development of 6G communication systems will enable the next hyper-connected experience in new dimensions through the hyper-connectivity of 6G communication systems that covers both connections between things and connections between humans and things. Particularly, it is expected that services such as truly immersive XR, high-fidelity mobile holograms, and digital replicas could be provided through 6G communication systems. In addition, with enhanced security and reliability, services such as remote surgery, industrial automation, and emergency response will be provided through 6G communication systems, and thus these services will be applied to various fields including industrial, medical, automobile, and home appliance fields.

Mobile communication systems including 3G, LTE, and 5G systems provide connectivity enabling transmission and reception of voices and data between various devices. Mobile communication systems provide connectivity enabling transmission and reception of voices and data not only for a portable personal UE, such as a mobile phone, a smartphone, and a personal tablet, a light and small sensor device, and an IoT device, but also for a high-mobility device, such as a connected car, a drones, and an unmanned aerial vehicle (UAV), and the number and range of devices provided with connectivity through mobile communication systems are expected to continue to increase.

Existing mobile communication systems perform communication by allocating a radio frequency resource to a device under control of a ground base station installed on the ground when providing connectivity to the device. A ground base station is easy to install and manage, but has a physical limitation that an installation location is the ground. This limitation makes it difficult to provide connectivity of a mobile communication system for the ocean in which a ground base station is difficult to install and a device on the ocean (e.g., a smartphone on a ship or vessel) or the air at a certain altitude or higher or a device (e.g., an airplane, an HAP, or a hot-air balloon) in the air.

To overcome the physical limitation of existing mobile communication and expand the range of connectivity from the ground to the entire Earth, a mobile communication system in which a terrestrial network and a satellite network are combined is emerging in 5G, beyond 5G, and 6G mobile communications.

An existing satellite network has been operated as an independent network separately from a mobile communication system, and communication with the satellite network is performed through a dedicated UE and device. Thus, for a user of an existing mobile communication network to use the satellite network, additional efforts to purchase a separate device and register the user in the satellite network are required. To resolve this inconvenience in using the satellite network and to provide seamless connectivity for the user regardless of the position of the user, a satellite-integrated terrestrial network technology (non-terrestrial network (NTN) or satellite-integrated terrestrial network) in which a satellite network is combined with mobile communication is under discussion.

DETAILED DESCRIPTION OF THE INVENTION

Technical Problem

The disclosure is to provide a method and a device for preventing deterioration in performance of an application due to a transport control protocol (TCP) in a satellite-integrated terrestrial network.

Technical Solution

An operating method of a proxy in a mobile communication system in which a terrestrial network and a satellite network are combined according to an embodiment may include obtaining configuration information about a satellite cell connected with a UE for which a transport control protocol (TCP) session is established from a server that manages a satellite, calculating a first round trip time (RTT) between the satellite cell and the satellite and a data rate of the satellite cell, based on the configuration information about the satellite cell, and configuring a congestion window (CWND) value for the TCP session, based on the first RTT and the data rate of the satellite cell.

According to an embodiment, the operating method of the proxy may further include generating an RTT map between the satellite and the satellite cell and a data rate map between the satellite and the satellite cell, based on the configuration information about the satellite cell.

According to an embodiment, the operating method of the proxy may further include calculating a distance between a center of the satellite cell and the satellite, based on an altitude of the satellite, an elevation angle of the satellite, and configuration information about a spot beam forming the satellite cell that are included in the configuration information about the satellite cell, and calculating the first RTT, based on the distance between the center of the satellite cell and the satellite and a speed of light.

According to an embodiment, when the proxy is configured as a single proxy in the mobile communication system, the proxy may be configured in any one of the UE, the satellite, a ground station, and a core network.

According to an embodiment, when the proxy is configured as a paired proxy in the mobile communication system, a first proxy may be configured in the UE, and a second proxy may be configured in any one of the satellite, a ground station, and a core network.

According to an embodiment, the operating method of the proxy may further include identifying a state of a TCP buffer of the proxy, and determining whether a CWND value of a transmitting proxy needs to be adjusted, based on the state of the TCP buffer.

According to an embodiment, the operating method of the proxy may include determining that the CWND value of the transmitting proxy is smaller than an optimal value, based on the state of the TCP buffer, calculating a ratio of time when the buffer is empty to the RTT, and transmitting a first notification message including the ratio of time when the buffer is empty to the RTT to the transmitting proxy so that the CWND value of the transmitting proxy is adjusted to increase.

According to another embodiment, the operating method of the proxy may include determining that the CWND value of the transmitting proxy is greater than the optimal value, based on the state of the TCP buffer, calculating a variance in the buffer based on the RTT, and transmitting a second notification message including the variance in the buffer based on the RTT to the transmitting proxy so that the CWND value of the transmitting proxy is adjusted to decrease.

According to an embodiment, the operating method of the proxy may include receiving a handover-related message, and freezing the TCP session during a handover.

According to an embodiment, the operating method of the proxy may include identifying whether hybrid automatic repeat request (HARQ) or automatic repeat request (ARQ) retransmission occurs in a lower layer, and adjusting a retransmission timeout (RTO) value, based on a number of HARQ retransmissions or ARQ retransmissions.

A proxy device in a mobile communication system in which a terrestrial network and a satellite network are combined according to an embodiment of the disclosure may include: a transceiver; and a controller connected with the transceiver to control the transceiver, and configured to obtain configuration information about a satellite cell connected with a UE for which a transport control protocol (TCP) session is established from a server that manages a satellite, calculate a first round trip time (RTT) between the satellite cell and the satellite and a data rate of the satellite cell, based on the configuration information about the satellite cell, and configure a congestion window (CWND) value for the TCP session, based on the first RTT and the data rate of the satellite cell.

Advantageous Effects

A proxy device according to an embodiment of the disclosure may prevent deterioration in performance of an application using a transport control protocol (TCP) due to a difference in communication performance between a satellite-network section and a terrestrial-network section in a satellite-integrated terrestrial network, thereby improving the performance of the application using the TCP.

A proxy device according to an embodiment of the disclosure may prevent performance deterioration due to an increase in a slow start section when using an existing TCP satellite network.

A proxy device according to an embodiment of the disclosure may appropriately configure a congestion window (CWND) at the start of a TCP session, thereby providing an optimal data rate.

A proxy device according to an embodiment of the disclosure may prevent a TCP from unnecessarily reducing a packet transmission amount when retransmission occurs due to instability of a satellite link.

A proxy device according to an embodiment of the disclosure may prevent a TCP from unnecessarily reducing a packet transmission amount when a handover occurs due to a high speed of a satellite in communication with a low-Earth orbit or medium-Earth orbit satellite.

MODE FOR CARRYING OUT THE INVENTION

Figure 1:
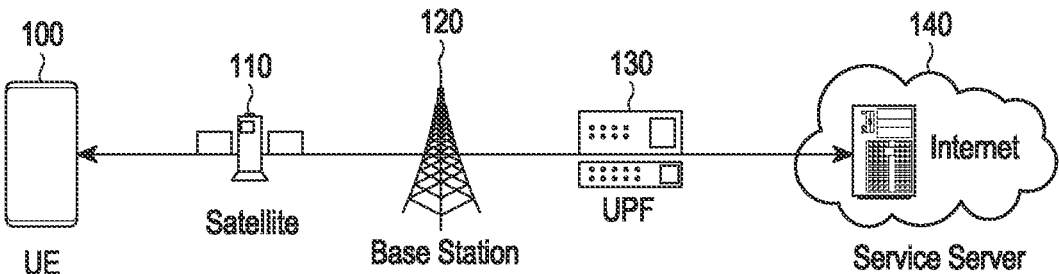
FIG. 1 illustrates a satellite integrated terrestrial network according to an embodiment of the disclosure.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

In the following description, terms for identifying access nodes, terms referring to network entities, terms referring to messages, terms referring to interfaces between network entities, terms referring to various identification information, and the like are illustratively used for the sake of descriptive convenience. Therefore, the disclosure is not limited by the terms as used below, and other terms referring to subjects having equivalent technical meanings may be used.

In the following description of the disclosure, terms and names defined in standards for 5G or NR and LTE systems are used for the sake of descriptive convenience. However, the disclosure is not limited by these terms and names, and may be applied in the same way to systems that conform other standards.

That is, the detailed description of embodiments of the disclosure will be mainly directed to the communication standards defined by 3GPP, but based on determinations by those skilled in the art, the main gist of the disclosure may also be applied to other communication systems having similar technical backgrounds through some modifications without significantly departing from the scope of the disclosure.

To resolve inconvenience in using a satellite network and to provide seamless connectivity for a user regardless of a position of the user, a satellite-integrated terrestrial network technology (non-terrestrial network (NTN) or satellite-integrated terrestrial network) in which a satellite network is combined with mobile communication is under active discussion.

Using the satellite-integrated terrestrial network makes it possible to not only connect existing devices connectable on the ground but also connect devices on the ocean and in the air and even devices in a rural area and a rugged area where a terrestrial network is not easy to install and an undeveloped area where mobile communication infrastructure is difficult to install.

The satellite-integrated terrestrial network has various advantages because a satellite network and a terrestrial network are managed in an integrated manner unlike an existing satellite network.

First, the satellite-integrated terrestrial network is designed to manage and operate the satellite network and the terrestrial network in the integrated manner, and thus is efficient in managing a device and a UE. Information, position, and security of a UE are managed in an integrated manner without dualization in integrated network infrastructure, thus achieving higher efficiency in network management costs and management than existing individual management.

Second, from a viewpoint of a user, seamless connectivity may be provided in an area where the satellite network and the terrestrial network coexist. In an existing dualized structure, when changing a network that provides connectivity for the UE from a terrestrial network to a satellite network or from the satellite network to the terrestrial network, it is difficult for the UE to be provided with seamless connectivity due to an information exchange between network managers in independent locations and reconfiguration. Particularly, since the satellite network and the terrestrial network are unavailable at the same time in one device, the user may need to change a device to a different dedicated device. However, in the satellite-integrated terrestrial network, seamless connectivity may be guaranteed without changing a device and a UE, and there is no need to change to a dedicated device and UE.

A satellite network shows distinctly different characteristics from a terrestrial network. Altitudes of satellites used in a satellite network or a satellite network of a satellite-integrated terrestrial network vary extensively. Types of used satellites are divided into geostationary (GEO) satellites and mobile satellites, and the mobile satellites are divided into low-Earth orbit (LEO) satellites and middle-Earth orbit (MEO) satellites according to an altitude of an orbit.

A geostationary satellite is a satellite flying in a geostationary orbit at an altitude of about 36,000 km, which has a period equal to Earth's rotational period and thus appears motionless at one point in the air when observed from the ground. When communicating with the geostationary satellite, due to a high satellite altitude, a radio signal is very weak due to path loss of the received radio signal compared to a terrestrial network, and communication performance through a radio signal is also low. Further, a round-trip time (RTT) between the satellite and a device and a UE on the ground is very long (about 500 milliseconds).

Since a low-Earth orbit satellite and a medium-Earth orbit satellite exist at lower altitudes than a geostationary satellite, path loss is small and a radio signal is relatively strong. However, compared to a terrestrial network, path loss is still considerable and a radio signal is weak. Further, unlike a geostationary satellite, the low-Earth orbit satellite and the medium-Earth orbit satellite move at a very high speed (about 7.56 km in a low-earth orbit) relative to the ground.

Satellites are largely divided into transparent satellites and regenerative satellites according to functions thereof.

A transparent satellite is a bent-pipe satellite, and has a function of amplifying and forwarding a signal transmitted from a terrestrial network. That is, the transparent satellite serves only as a type of relay node. The transparent satellite is not allowed to use an inter-satellite link (ISL).

A regenerative satellite is capable of performing calculation, processing, and decoding of a radio signal beyond serving simply as a relay node. The regenerative satellite is capable of not only serving as a distributed unit (DU) in NR but also serving as a central unit (CU) and serving as an independent base station. In addition, the regenerative satellite is capable of multi-hop communication between satellites using an ISL.

A satellite network forms a satellite cell, which is a unit for managing a UE through a spot beam emitted from a satellite. Since a low-Earth orbit satellite moves at a very high speed in a certain orbit, satellite coverage in which the satellite is able to communicate with a UE also moves along the satellite. Therefore, a method of operating a satellite cell varies according to a method of configuring a satellite cell.

Methods of configuring a satellite cell are classified into an Earth-moving cell and an Earth-fixed cell.

The Earth-moving cell is used in a satellite structure in which a satellite antenna is always fixed in a direction perpendicular to the horizon without rotation, and is a cell in which the satellite cell also has the same mobility as a satellite moves.

The Earth-fixed cell is a method of configuring an Earth-fixed area as a satellite cell regardless of mobility of a satellite while an antenna electronically or mechanically rotates.

An application used in a satellite-integrated terrestrial network is similar to that is a terrestrial network. Not only a text-based application (e.g., text transmission, MIMS transmission, and a notification service) that operates with relatively low transmission performance but also an application (e.g., a voice service, a web browser, file transmission, and media streaming) requiring high transmission performance are supportable in a satellite-integrated terrestrial network.

A plurality of applications generally uses a transport control protocol (TCP) to satisfy required performance of the applications. The TCP includes functions of guaranteeing reliability of communication data in an end-to-end connection between a server and a UE and preventing overload due to concentration of data traffic in a middle of the end-to-end connection.

When data is transmitted, a serial number (SN) is assigned for each data to identify a data transmission order, and when data is normally received, an ACK message is transmitted to notify a transmitting UE or server that the data has been normally received.

When excessive data is concentrated on a data transmission path and thus congestion occurs, a data transmission amount suitable for the transmission path is configured through a congestion control technique. An application (e.g., a web browser, file transfer, and media streaming) in which reliability of data is important generally uses the TCP, and the TCP is expected to be continuously used in the future.

However, the TCP is a protocol designed for a terrestrial wired network. The TCP is designed to recognize a cause of a problem that occurs in a wired end-to-end connection environment and improve performance through an appropriate response, and thus does not show optimal performance in an environment other than the wired environment (e.g., a wireless environment and a satellite network environment) due to a characteristic of a design. Deterioration in performance of the TCP in a wireless environment has been pointed out as a problem even in existing mobile communications.

Packet transmission failure or a rapid increase in packet transmission delay time in a wired network is caused mostly by traffic congestion in which overload occurs due to concentration of network traffic in an end-to-end connection path.

However, in a wireless network, a wireless link is more unstable than a wired link. Since a radio frequency resource is shared, the TCP shows low performance depending on a wireless communication environment. In addition, when a handover occurs in which a wireless connection state changes as a device and a UE using wireless communication move, the TCP also shows low performance. Accordingly, packet transmission failure frequently occurs in the wireless link, and a packet having failed to be transmitted is retransmitted a certain number of times to compensate for the transmission failure in wireless communication using the wireless link. When the packet continuously fails to be transmitted even after the certain number of retransmissions, retransmission is stopped.

When using the TCP in wireless communication, the TCP recognizes performance deterioration (e.g., packet transmission failure and an increase in transmission delay time) due to transmission failure as performance deterioration due to traffic congestion as in the wired network, and applies the same solution in the same manner as in the wired network. However, this performance deterioration is not solved by the same method as in the wired network. Instability of the wireless link occurs due to a position of a device and a UE, a state of a radio resource, radio interference, and the like, and thus is not solved by a technique of temporarily reducing a packet transmission amount (congestion control) used in the TCP to solve traffic congestion.

Rather, the packet transmission amount is forcibly reduced even though there are radio resources available for a device and a UE, and thus radio frequency resources are not efficiently used, resulting in deterioration in overall communication performance from a viewpoint of a network.

To solve the problems that occur when using the TCP in wireless communication, a method of improving performance of a wireless link as much as that of a wired link is used in existing mobile communication. By minimizing packet transmission failure that occurs in the wireless link and applying techniques including network coding, waveform, adaptive modulation scheme (MCS), and HARQ to mobile communication, the performance of the wireless link is improved close to that of the wired link, and the TCP operates according to a design purpose.

Performance deterioration that occurs when the TCP is applied in a satellite-integrated terrestrial network is greater than performance deterioration that occurs when the TCP is applied in mobile communication. In satellite communication via a geostationary satellite, an RTT is very long. In some TCPs, there is a slow start section in which a packet transmission amount is gradually increased based on an RTT at the beginning of a TCP connection. Since the RTT is very long, a rate of increase in the packet transmission amount is very slow. Accordingly, it takes a longer time to reach an optimal communication speed, which incurs a reduction in overall communication performance.

Due to a high altitude of a geostationary orbit, radio signal strength is very low due to signal attenuation (path loss) compared to a terrestrial network. Therefore, stability of a satellite link is lower than that of the terrestrial network, and packet transmission failure and packet retransmission frequently occur. As mentioned above, frequent retransmissions are recognized by the TCP as traffic congestion, and drastically reduce a packet transmission amount. However, retransmission in the satellite link is a phenomenon caused by instability of the satellite link, and thus is not an appropriate solution.

A mobile satellite moves at a very high speed relative to a device and a UE on the ground. Therefore, the device and the UE in a satellite network experience an environment similar to a situation (e.g., a smartphone on a train) in which the UE or the device moves very fast in a terrestrial network even though the device and UE are stationary. The devices and the UE experience a handover in which a connected satellite is changed every several seconds to several minutes, and the handover temporarily increases a packet transmission delay time or causes transmission failure of some packets in packet transmission. In this case, the TCP considers a temporary phenomenon caused by the handover due to a high speed of the satellite as traffic congestion, and drastically reduces a packet transmission amount. This method is also not a solution to performance deterioration due to the handover, and incurs a reduction in overall communication performance.

Application performance deterioration due to the TCP in a satellite network has been pointed out as a problem in an existing satellite network. A plurality of new TCPs has been developed to solve a problem caused by structural characteristics of satellite networks. However, to apply the new TCPs to a satellite network or a satellite-integrated terrestrial network, there are many realistic limitations that need to be overcome. First, the new TCPs need to be applied to a UE capable of accessing a satellite network. While the new TCPs are applicable to a newly manufactured UE, an existing UE needs to be changed to apply the new TCPs.

Further, since a plurality of applications communicates with a server (e.g., a cloud server or a web server) in a terrestrial network, a TCP of the server on the ground also needs to be changed to a new TCP. A great amount of time is actually needed to change all TCPs to the new TCPs.

Existing satellite communication is used as a structure for communication using a dedicated satellite communication UE. However, research and standardization of a technology that combines conventional satellite communication technology and terrestrial mobile communication technology to use both satellite communication and mobile communication with a single UE is being conducted under a similar structure and standard under a subject of NTN in the 3GPP.

FIG. 1 illustrates a satellite integrated terrestrial network according to an embodiment of the disclosure.

Referring to FIG. 1, the satellite integrated terrestrial network includes a UE 100 capable of supporting satellite communication and mobile communication, a satellite 110, a ground station or a ground base station 120 capable of communicating with the satellite, a core network 130 that manages a satellite network, and a service server 140 that provides the Internet. In particular, the core network 130 may include a user plane function (UPF) 130.

A link that connects the components 100 to 140 include a service link that connects the UE 100 and the satellite 110, a feeder link that connects the satellite 110 and a terrestrial network or the ground base station 120, and a link that connects the ground base station 120 and the core network 130.

FIG. 2 to FIG. 9 illustrate a satellite integrated terrestrial network including a proxy according to an embodiment of the disclosure.

The satellite integrated terrestrial network proposed in each of FIG. 2 to FIG. 9 includes a satellite, a UE wirelessly connectable to the satellite, a ground station or a ground base station connectable to the satellite, a core network that controls the satellite integrated terrestrial network, a server that communicates with the UE, and a proxy.

The satellite is a satellite having various altitudes, and includes a geostationary satellite, a middle Earth orbit satellite, and a low Earth orbit satellite. According to a proxy structure proposed in the disclosure, the satellite integrated terrestrial network may include a single proxy or a paired proxy.

The single proxy is a case in which a single proxy is installed, in which case the proxy exists in the ground station, the base station, the core network, or the satellite.

The paired proxy is a case in which two proxies are installed, in which case a first proxy may exist in the UE and a second proxy may exist in the ground station, the base station, the core network, or the satellite.

The proxy proposed in the disclosure includes programmed software, firmware, and an application in addition to a physical proxy server.

The proxy proposed in the disclosure may store an RTT map between the satellite and a satellite cell and a TCP bandwidth map between the satellite and the satellite cell. The RTT map between the satellite and the satellite cell and the TCP bandwidth map between the satellite and the satellite cell are information used when configuring an initial congestion window (CWND) in a terrestrial mobile cell environment, and may be configured based on a characteristics that a distance between the satellite and the satellite cell is the same regardless of an orbit and position of the satellite in the terrestrial mobile cell environment.

The proxy proposed in the disclosure may provide a buffer-based CWND adjustment function after configuring the initial CWND. The proxy may also provide a TCP session freezing function based on handover information between the UE and the satellite and an adaptive retransmission timeout (RTO) adjustment function based on retransmission information in satellite communication with the UE.

The proxy proposed in the disclosure serves to divide an end-to-end TCP session.

In a single proxy structure, a TCP session between the UE and the server may be divided into a TCP session between the UE and a proxy in the ground station and a TCP session between the proxy and the server.

In a paired proxy structure, a TCP session between the UE and the server may be divided into a TCP session between the UE and an in-UE proxy, a TCP session between the in-UE proxy and a proxy in the ground station, and a TCP session between the proxy in the ground station and the server.

Communication may be performed independently in each TCP session, and each proxy has a buffer to store a packet. The proxy may store (or include) an RTT map between satellite cells and data rate map information between the satellite cells for the terrestrial mobile cell environment.

The proxy may perform an operation of calculating a distance between the satellite cells by using the RTT map between the satellite cells, and may calculate a data rate between the satellite cell by using a mathematical model (e.g., a propagation loss model or a path loss model) for inferring a data rate based on the distance between the satellite cells, or may calculate the data rate between the satellite cells by using a statistical method based on an average data rate of each satellite cell.

Figure 2:
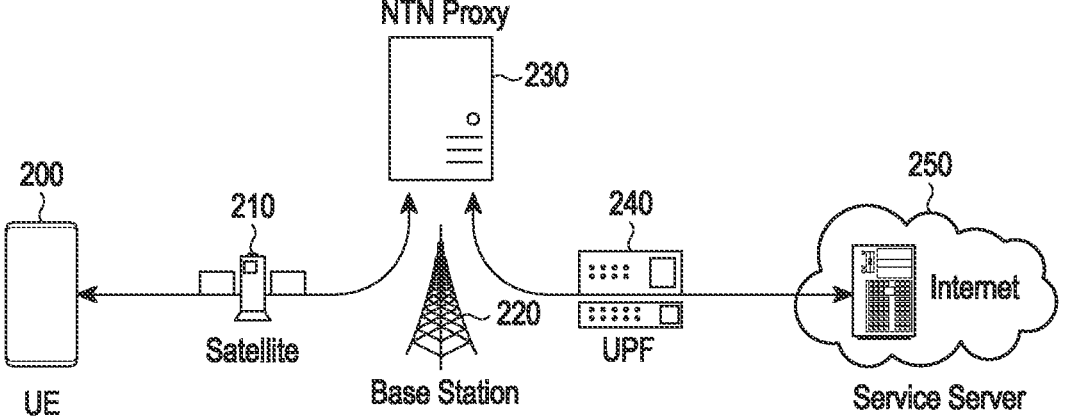
FIG. 2 illustrates a satellite integrated terrestrial network including a proxy according to an embodiment of the disclosure.

FIG. 2 illustrates a satellite integrated terrestrial network including a proxy according to an embodiment of the disclosure.

Referring to FIG. 2, the satellite integrated terrestrial network includes a UE 200 capable of supporting satellite communication and mobile communication, a satellite 210, a ground station or a ground base station 220 capable of communicating with the satellite, a non-terrestrial network (NTN) proxy 230, a UPF 240, and a service server 250.

The embodiment illustrated in FIG. 2 proposes a single proxy structure in which the NTN proxy 230 exists in the ground station or the ground base station 220 capable of communicating with the satellite. A TCP session between the UE 200 and the service server 250 may be divided into a first TCP session between the UE 200 and the NTN proxy 230 and a second TCP session between the NTN proxy 230 and the service server 250.

Figure 3:
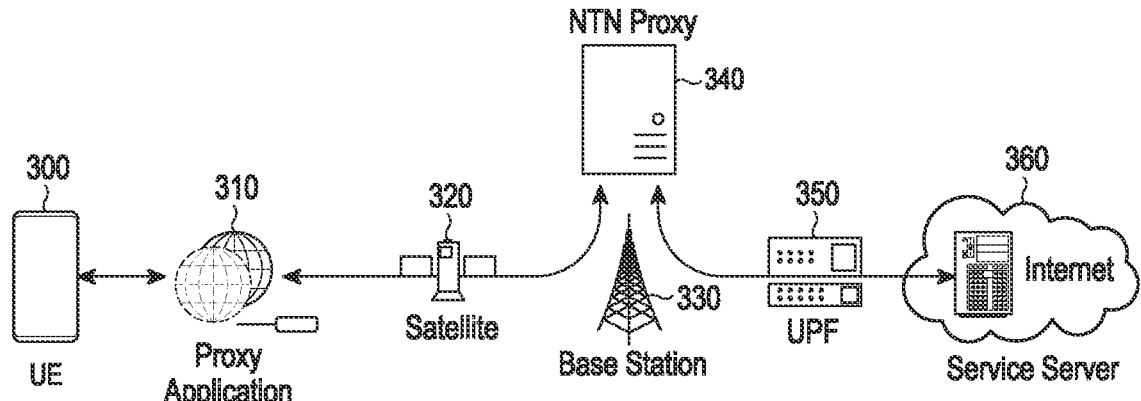
FIG. 3 illustrates a satellite integrated terrestrial network including a proxy according to another embodiment of the disclosure.

FIG. 3 illustrates a satellite integrated terrestrial network including a proxy according to another embodiment of the disclosure.

Referring to FIG. 3, the satellite integrated terrestrial network includes a UE 300 capable of supporting satellite communication and mobile communication, an in-UE proxy (or proxy application) 310, a satellite 320, a ground station or a ground base station 330 capable of communicating with the satellite, a non-terrestrial network (NTN) proxy 340, a UPF 350, and a service server 360.

The embodiment illustrated in FIG. 3 proposes a paired proxy structure in which the in-UE proxy 310 exists in the UE 300 and the NTN proxy 340 exists in the ground station or the ground base station 330 capable of communicating with the satellite. A TCP session between the UE 300 and the service server 360 may be divided into a first TCP session between the UE 300 and the in-UE proxy 310, a second TCP session between the in-UE proxy 310 and the proxy 340 in the ground station, and a third TCP session between the proxy 340 in the ground station and the service server 360.

Figure 4:
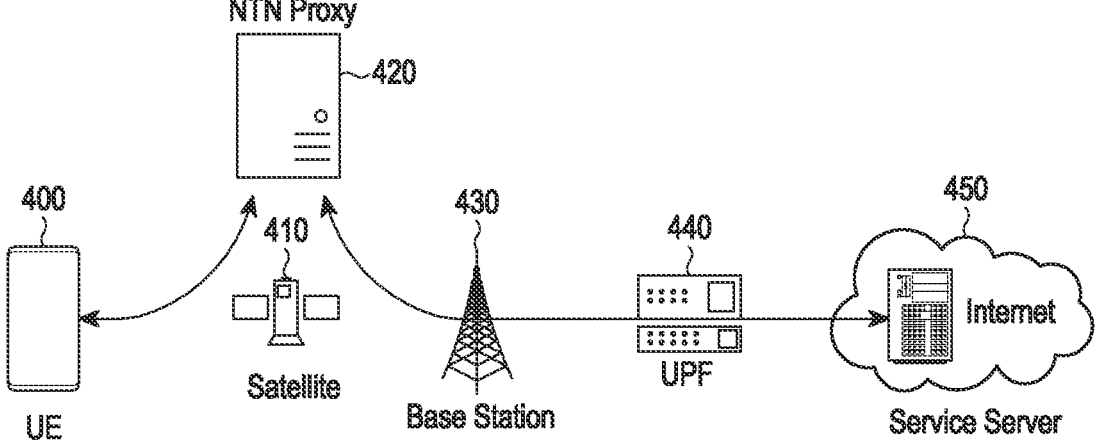
FIG. 4 illustrates a satellite integrated terrestrial network including a proxy according to still another embodiment of the disclosure.

FIG. 4 illustrates a satellite integrated terrestrial network including a proxy according to still another embodiment of the disclosure.

Referring to FIG. 4, the satellite integrated terrestrial network includes a UE 400 capable of supporting satellite communication and mobile communication, a satellite 410, a non-terrestrial network (NTN) proxy 420 existing in the satellite, a ground station or a ground base station 430 capable of communicating with the satellite, a UPF 440, and a service server 450.

The embodiment illustrated in FIG. 4 proposes a single proxy structure in which the NTN proxy 230 exists in the satellite 410. A TCP session between the UE 400 and the service server 450 may be divided into a first TCP session between the UE 400 and the NTN proxy 420 and a second TCP session between the NTN proxy 420 and the service server 450.

Figure 5:
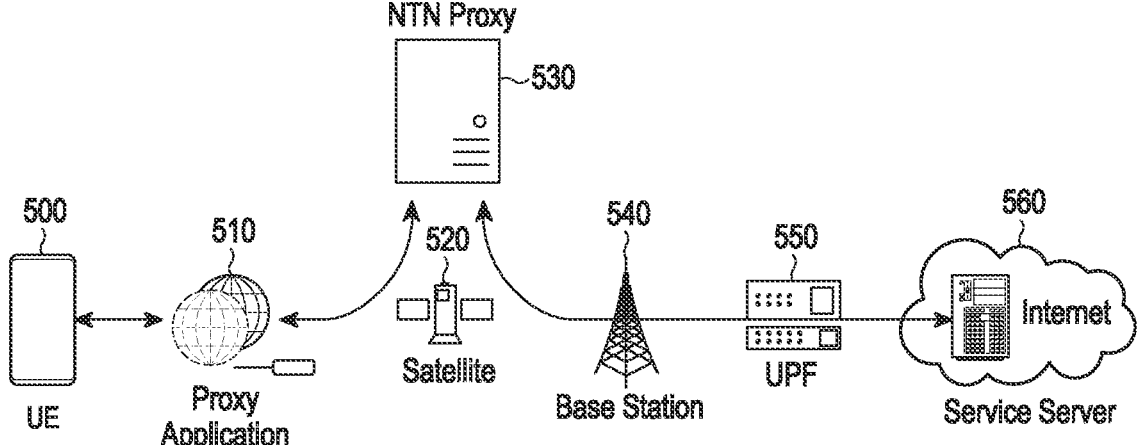
FIG. 5 illustrates a satellite integrated terrestrial network including a proxy according to yet another embodiment of the disclosure.

FIG. 5 illustrates a satellite integrated terrestrial network including a proxy according to yet another embodiment of the disclosure.

Referring to FIG. 5, the integrated satellite terrestrial network includes a UE 500 capable of supporting satellite communication and mobile communication, an in-UE proxy (or proxy application) 510, a satellite 520, a non-terrestrial network (NTN) proxy 530 in the satellite, a ground station or a ground base station 540 capable of communicating with the satellite, a UPF 550, and a service server 560.

The embodiment illustrated in FIG. 5 proposes a paired proxy structure in which the in-UE proxy 510 exists in the UE 500 and the NTN proxy 530 exists in the satellite 520. A TCP session between the UE 500 and the service server 560 may be divided into a first TCP session between the UE 500 and the in-UE proxy 510, a second TCP session between the in-UE proxy 510 and the proxy 530 in the ground station, and a third TCP session between the proxy 530 in the ground station and the service server 560.

Figure 6:
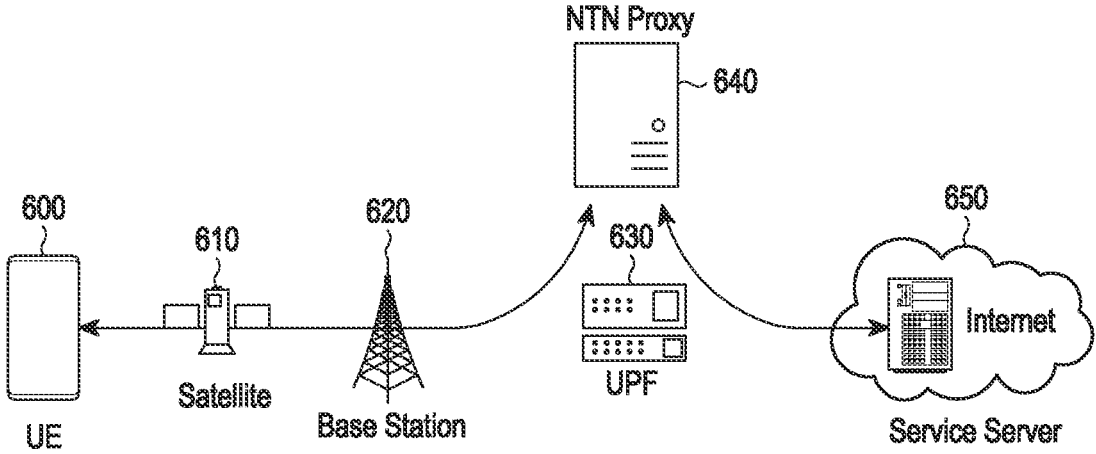
FIG. 6 illustrates a satellite integrated terrestrial network including a proxy according to still another embodiment of the disclosure.

FIG. 6 illustrates a satellite integrated terrestrial network including a proxy according to still another embodiment of the disclosure.

Referring to FIG. 6, the satellite integrated terrestrial network includes a UE 600 capable of supporting satellite communication and mobile communication, a satellite 610, a ground station or a ground base station 620 capable of communicating with the satellite, a UPF 630, a non-terrestrial network (NTN) proxy 640 existing in the UPF 630, and a service server 650.

The embodiment illustrated in FIG. 6 proposes a single proxy structure in which the NTN proxy 640 exists in the UPF 630. A TCP session between the UE 600 and the service server 650 may be divided into a first TCP session between the UE 600 and the NTN proxy 640 and a second TCP session between the NTN proxy 640 and the service server 650.

Figure 7:
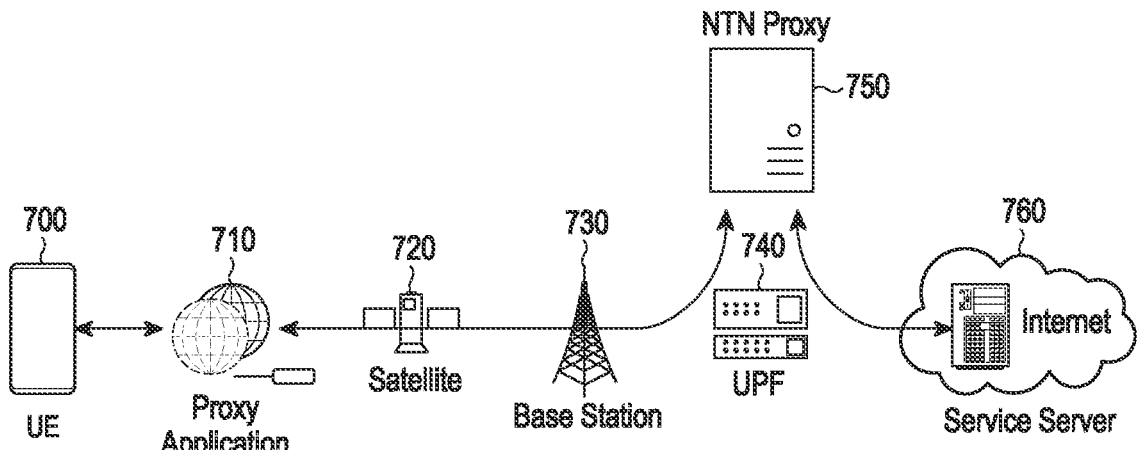
FIG. 7 illustrates a satellite integrated terrestrial network including a proxy according to yet another embodiment of the disclosure.

FIG. 7 illustrates a satellite integrated terrestrial network including a proxy according to yet another embodiment of the disclosure.

Referring to FIG. 7, the satellite integrated terrestrial network includes a UE 700 capable of supporting satellite communication and mobile communication, an in-UE proxy (or proxy application) 710, a satellite 720, a ground station or a ground base station 730 capable of communicating with the satellite, a UPF 740, a non-terrestrial network (NTN) proxy 750 in the UPF 740, and a service server 760.

The embodiment illustrated in FIG. 7 proposes a paired proxy structure in which the in-UE proxy 710 exists in the UE 700 and the NTN proxy 750 exists in the UPF 740. A TCP session between the UE 700 and the service server 760 may be divided into a first TCP session between the UE 700 and the in-UE proxy 710, a second TCP session between the in-UE proxy 710 and the proxy 750 in the ground station, and a third TCP session between the proxy 750 in the ground station and the service server 760.

Figure 8:
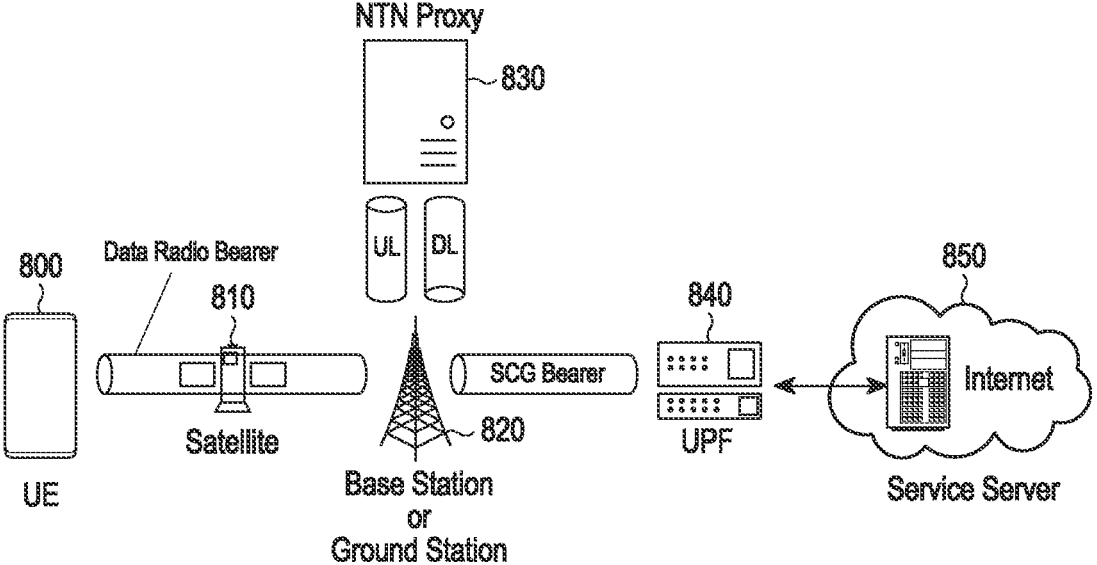
FIG. 8 illustrates tunneling of a satellite integrated terrestrial network including a proxy according to an embodiment of the disclosure.

FIG. 8 illustrates tunneling of a satellite integrated terrestrial network including a proxy according to an embodiment of the disclosure.

Referring to FIG. 8, the satellite integrated terrestrial network includes a UE 800 capable of supporting satellite communication and mobile communication, a satellite 810, a ground station or a ground base station 820 capable of communicating with the satellite, a non-terrestrial network (NTN) proxy 830, a UPF 840, and a service server 850.

In the embodiment illustrated in FIG. 8, the UE 800, the satellite 810, and the ground station or the ground base station 820 capable of communicating with the satellite may be connected through a data radio bearer (DRB), the ground station or the ground base station 820 capable of communicating with the satellite and the NTN proxy 830 may be connected through an uplink (UL) and a downlink (DL), and the ground station or the ground base station 820 capable of communicating with the satellite and the UPF 840 may be connected through an SCG bearer.

Figure 9:
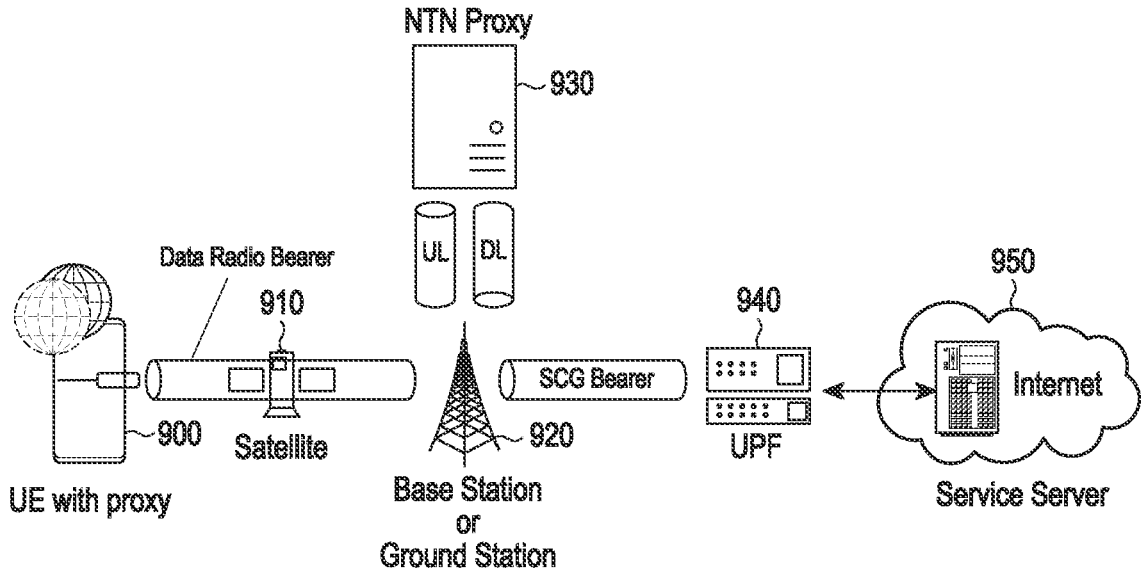
FIG. 9 illustrates tunneling of a satellite integrated terrestrial network including a proxy according to another embodiment of the disclosure.

FIG. 9 illustrates tunneling of a satellite integrated terrestrial network including a proxy according to another embodiment of the disclosure.

Referring to FIG. 9, the satellite integrated terrestrial network includes a UE 900 that is capable of supporting satellite communication and mobile communication and includes a proxy, a satellite 910, a ground station or a ground base station 920 capable of communicating with the satellite, a non-terrestrial network (NTN) proxy 930, a UPF 940, and a service server 950.

In the embodiment illustrated in FIG. 9, the UE 900 including the proxy, the satellite 910, and the ground station or the ground base station 920 capable of communicating with the satellite may be connected through a data radio bearer (DRB) the ground station or the ground base station 920 capable of communicating with the satellite and the NTN proxy 930 may be connected through an uplink (UL) and a downlink (DL), and the ground station or the ground base station 920 capable of communicating with the satellite and the UPF 940 may be connected through an SCG bearer.

Figure 10:
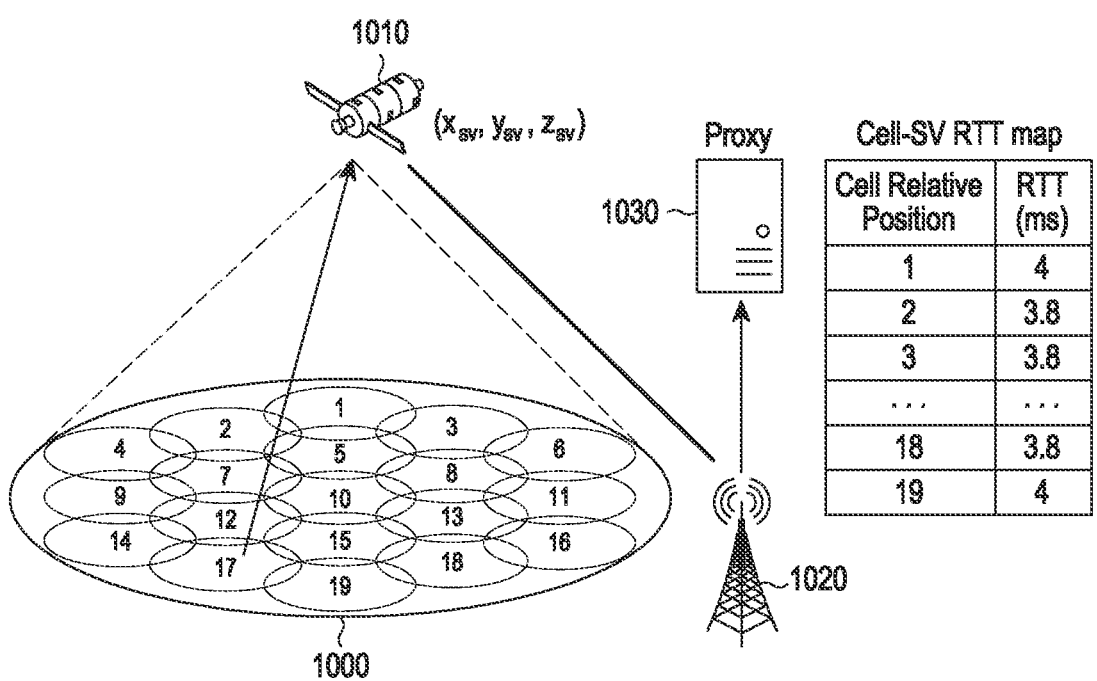
FIG. 10 illustrates an example of configuring an RTT map between a satellite and a satellite cell according to an embodiment of the disclosure.

FIG. 10 illustrates an example of configuring a satellite-satellite cell RTT map according to an embodiment of the disclosure.

Referring to FIG. 10, a satellite integrated terrestrial network includes a plurality of satellite cells 1000, a satellite 1010, a ground station or a ground base station 1020, and a proxy 1030.

The proxy 1030 may obtain configuration information about a satellite cell from a server (e.g., a TT&C server, a telemeter, a tracking and control center, or a core network) that manages a satellite.

The proxy 1030 may calculate a distance between a center of the satellite cells 1000 and the satellite 1010 by using an altitude of the satellite 1010, an elevation angle of the satellite 1010, and configuration information about a spot beam forming the satellite cells 1000. The proxy 1030 may configure a satellite-satellite cell RTT map (cell-SV RTT map) including a result of calculating an RTT in communication with the satellite 1010 at the center of the satellite cells 1000 by using the calculated distance between the center of the satellite cells 1000 and the satellite 1010 and a speed of light. Equation 1 below is an equation for calculating an RTT.

$$RTT_{SV\_CC} = 2 \times \frac{\sqrt{(x_{SV} - x_{CC})^2 + (y_{SV} - y_{CC})^2 + (z_{SV} - z_{CC})^2}}{C} \quad \text{Equation 1}$$

In Equation 1, an RTT denotes an average RTT between the satellite cells and the satellite. $x_{sv}$, $y_{sv}$, and $z_{sv}$ denote x, y, and z coordinates of the satellite 1010 from the center of the Earth. $x_{cc}$, $y_{cc}$, and $z_{cc}$ denote x, y, and z coordinates of the center of the satellite cells 1000 from the center of the Earth.

For example, the cell-satellite cell RTT map (cell-SV RTT map) may be configured as a table of mapping between each cell relative position and an RTT. In FIG. 10, an RTT of a satellite cell with a cell relative position of "1" may be 4 ms, an RTT of a satellite cell with a cell relative position of "2" may be 3.8 ms, and an RTT of a satellite cell with a cell relative position of "19" may be 4 ms.

Figure 11:
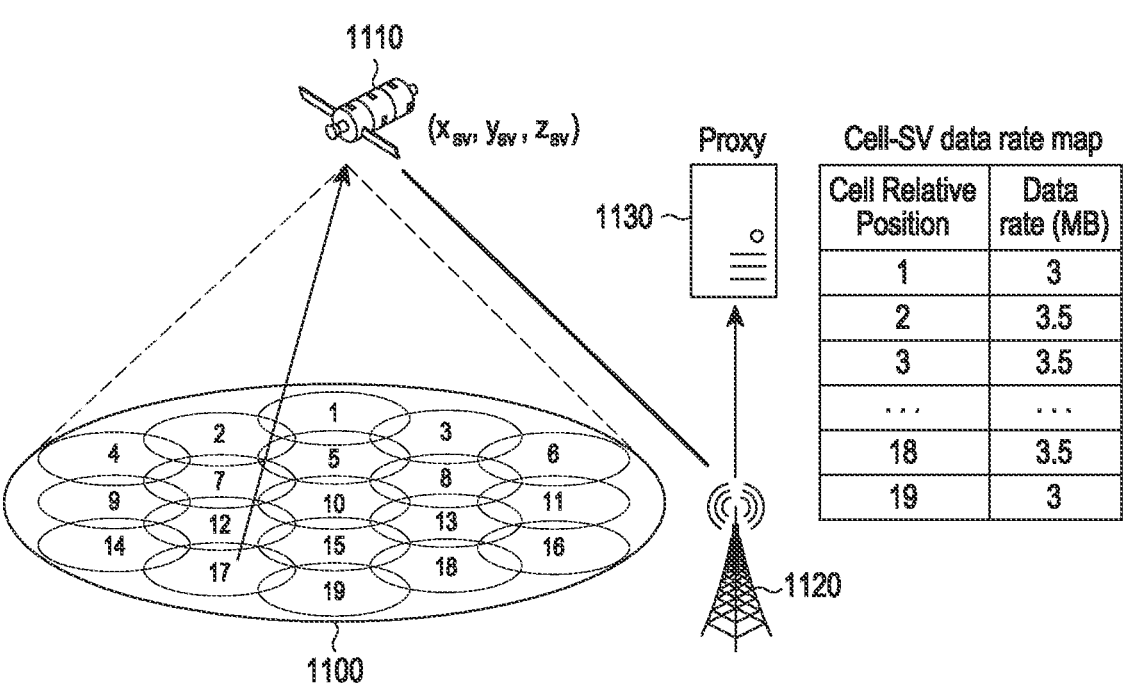
FIG. 11 illustrates an example of configuring a data rate map between satellite cells according to an embodiment of the disclosure.

FIG. 11 illustrates an example of configuring a satellite-satellite cell data rate map according to an embodiment of the disclosure.

Referring to FIG. 11, a satellite integrated terrestrial network includes a plurality of satellite cells 1100, a satellite 1110, a ground station or a ground base station 1120, and a proxy 1130.

The proxy 1130 may calculate a distance between a center of the satellite cells 1100 and the satellite 1110 by using configuration information about a spot beam forming the satellite cells 1100, which is the same as an operation described in FIG. 10.

A data rate between the satellite cells 1100 and the satellite 1010 (cell-SV data rate map) may be calculated by using a transmission power (EIRP) of the satellite 1110, frequency information about a channel, an antenna gain of a UE, a propagation loss model (path loss model), and information about the calculated distance between the center of the satellite cells 1100 and the satellite 1110.

For example, the data rate between the satellite cells 1100 and the satellite 1010 (cell-SV data rate map) may be configured as a table of mapping between each cell relative position and a data rate. In FIG. 11, a data rate of a satellite cell with a cell relative position of "1" may be 3 MB, a data rate of a satellite cell with a cell relative position of "2" may be 3.5 MB, and a data rate of a satellite cell with a cell relative position of "19" may be 3 MB.

According to another embodiment, the proxy 1130 may perform a statistical configuration in addition to the foregoing configuration operation. A data rate map between satellite cells (cell-SV data rate map) may be configured by collecting information about a cell to which the UE is connected when the UE performs data communication and a data rate during the data communication.

Figure 12:
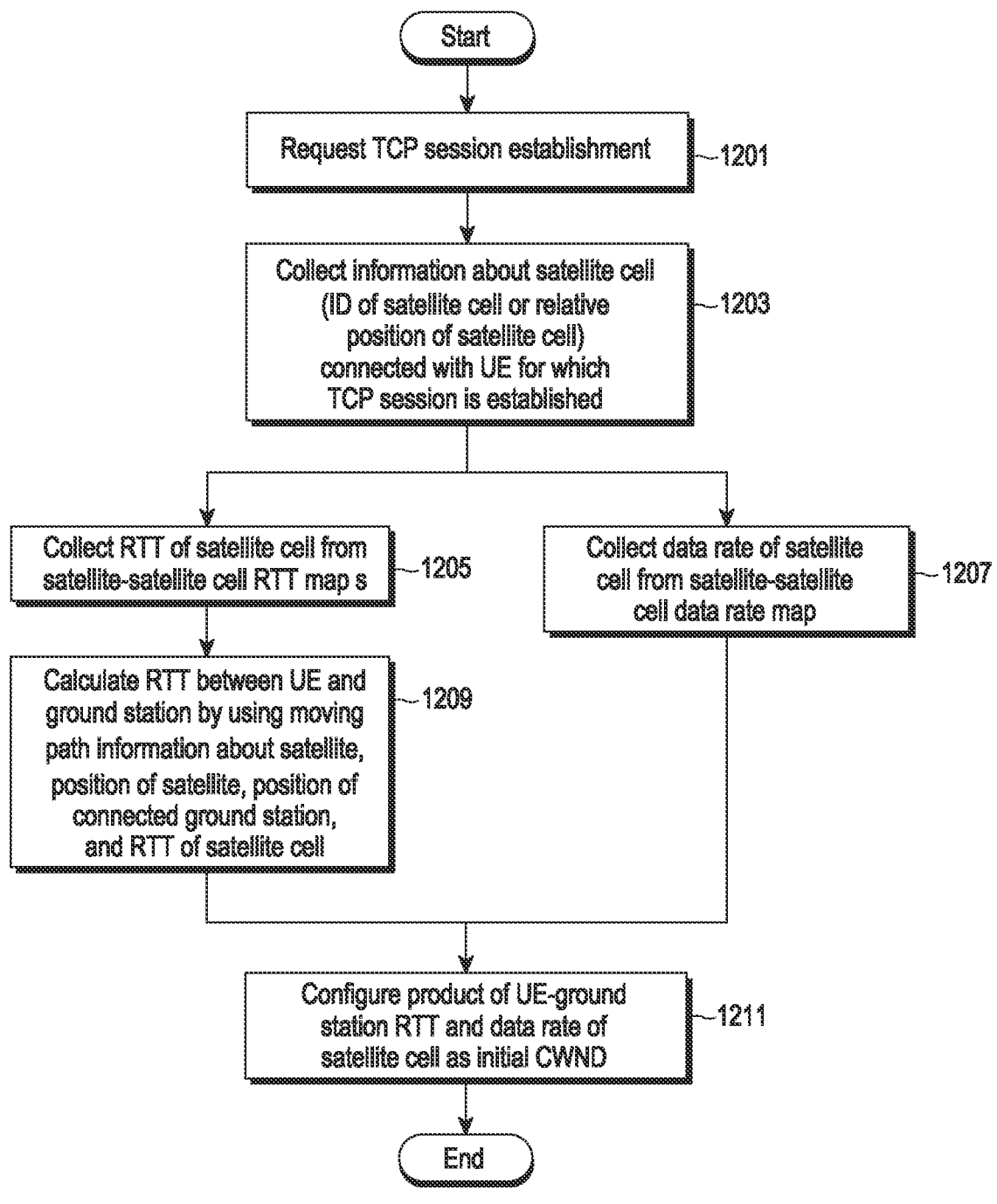
FIG. 12 illustrates a process in which a proxy configures an initial CWND according to an embodiment of the disclosure.

FIG. 12 illustrates a process in which a proxy configures an initial CWND according to an embodiment of the disclosure.

Referring to FIG. 12, the proxy may request TCP session establishment in operation 1201, and may collect information about a satellite cell (e.g., an ID of the satellite cell or a relative position of the satellite cell) connected with a UE for which a TCP session is established in operation 1203.

The proxy may collect information about an RTT of the satellite cell from an RTT map between a satellite and satellite cells in operation 1205, and may collect information about a data rate of the satellite cell from a data rate map between the satellite and the satellite cells in operation 1207.

Alternatively, in operation 1209, the proxy may calculate an RTT between the UE and a ground station by using moving path information about the satellite, a position of the satellite, a position of the connected ground station, and an RTT between the satellite and the satellite cells.

In operation 1211, the proxy may configure a product of the RTT between the UE and the ground station and the data rate (or TCP bandwidth) between the satellite and the satellite cell as an initial CWND.

When configuring the TCP session (time when a UE starts data communication), the proxy may calculate the RTT and a TCP bandwidth between the UE and the ground station by using current position information about the UE, the position of the satellite according to the moving path information about the satellite, and the position of the ground station to be connected, and may configure an initial CWND value by using a calculation result.

The position information about the UE may be inferred from the information about the satellite cell currently connected with the UE. The information about the cell connected with the UE may be obtained through a server (e.g., a TT&C server, a core network, or a UPF) that manages a satellite network, or the proxy may autonomously manage movement information. The RTT between the UE and the ground station is calculated by using information of the RTT map between the satellite and the satellite cell, information about the position of the satellite, and information about the position of the ground station. For calculation, Equation 2 below is used.

$$RTT_{CC\_GW} = \\ RTT_{SV\_CC} + 2 \times \frac{\sqrt{(x_{SV} - x_{GW})^2 + (y_{SV} - y_{GW})^2 + (z_{SV} - z_{GW})^2}}{C} \quad \text{Equation 2}$$

RTTCC_GW denotes an RTT between the satellite cell where the UE exists and the ground station. XGW, YGW, and ZGW denote x, y, and z coordinates of the connected ground station from the center of the Earth. xsv, ysv, and zsv denote x, y, and z coordinates of the satellite from the center of the Earth.

As the TCP bandwidth, a value in the foregoing data rate map between the satellite and the satellite cells is used. Due to a characteristic of satellite communication, performance of a communication link between the UE and the satellite determines performance of a communication link between the UE and the ground station, and thus the value in the data rate map between the satellite and satellite cells is used as the TCP bandwidth.

Finally, the initial CWND value is determined as a product of the RTT between the satellite cell and the ground station and the TCP bandwidth. An equation for calculation is illustrated below. In Equation 3 below, BWCC_SV is a date rate value (TCP bandwidth) obtained from a data rate map between the satellite cells and the ground station.

$$CWND_{init} = RTT_{CC\_GW} \times BW_{CC\_SV} \qquad \text{Equation 3}$$

The proxy proposed in the disclosure provides a function of adjusting the CWND, based on a variance in a buffer after configuring the initial CWND.

The initially configured CWND value may not be an optimal value due to various circumstances. Causes for the CWND value not being the optimal value include mobility of the UE, use of inaccurate information based on the center of the satellite cell, changes in data traffic in the UE or the server, and radio interference in the stratosphere.

When the initial CWND is not the optimal value, over-shooting of transmitting a greater amount of data than a transmittable data amount to cause a buffer overflow may occur, and undershooting of transmitting a smaller amount of data than the transmittable data amount to make impossible to maximally utilize available radio resources may occur.

The disclosure proposes an adaptive CWND adjustment technique based on a variance in a buffer of a proxy server to solve the above problem.

After the TCP session is established, the proxy continuously monitors the buffer thereof. The proxy divides the buffer thereof into a balanced section (BS) and an overshooting notification section (ONS). The BS refers to a space of a certain proportion starting from the beginning of the buffer, and the ONS refers to a remaining space other than the BS.

The proxy may use a variable "zero_buffer_count" to monitor the variance in the buffer. The variable "zero_buffer_count" may be increased by 1 whenever data stored in the buffer becomes 0 while the TCP session starts and data is transmitted.

When "zero_buffer_count" is equal to or greater than a certain value defined as "zero_buffer_count_limit", the proxy recognizes this case as undershooting and transmits an undershooting notification (UN) message to the UE/server transmitting the data. The UN message may include information about a ratio of time when the buffer is empty to the RTT. Upon receiving the UN message, the proxy increases an amount of transmitted traffic at a fixed rate.

The proxy receiving the UN message transmits a great amount of data corresponding to the ratio of the time when the buffer is empty to the RTT, which is expressed as Equation 4 below.

$$CWND_{new} = CWND\left(1 + \frac{T_{zero} - T_s}{RTT}\right) \qquad \text{Equation 4}$$

In Equation 4, CWNDnew denotes a newly adjusted CWND, CWND denotes the CWND before adjustment, and $$\frac{T_{zero} - T_s}{RTT}$$

denotes the ratio of the time when the buffer is empty to the RTT.

When the data stored in the buffer exists in the BS and "zero_buffer_count" is less than "zero_buffer_count_limit", the CWND is determined to be close to the optimal value, thus not transmitting a notification.

When the data stored in the buffer exists in both the BS and the ONS, the proxy determines this case as overshooting, and transmits an overshooting notification (ON) message so that the proxy/server transmitting the data reduces a data transmission amount. The ON message may include information about the variance in the buffer per RTT (ΔBRTT).

Upon receiving the ON message, the proxy transmits a small amount of data corresponding to the variance in the buffer in a next data transmission time, which is expressed as Equation 5 below.

$$CWND_{new} = \left\lfloor \frac{CWND \times \text{Segment\_size} - \Delta B_{RTT}}{\text{Segment\_size}} \right\rfloor \qquad \text{Equation 5}$$

In Equation 5, CWNDnew is a newly adjusted CWND, CWND is the CWND before adjustment, Segment_size is the size of the TCP segment, and ΔBRTT is the variance (byte) in the buffer per RTT described above.

Figure 13:
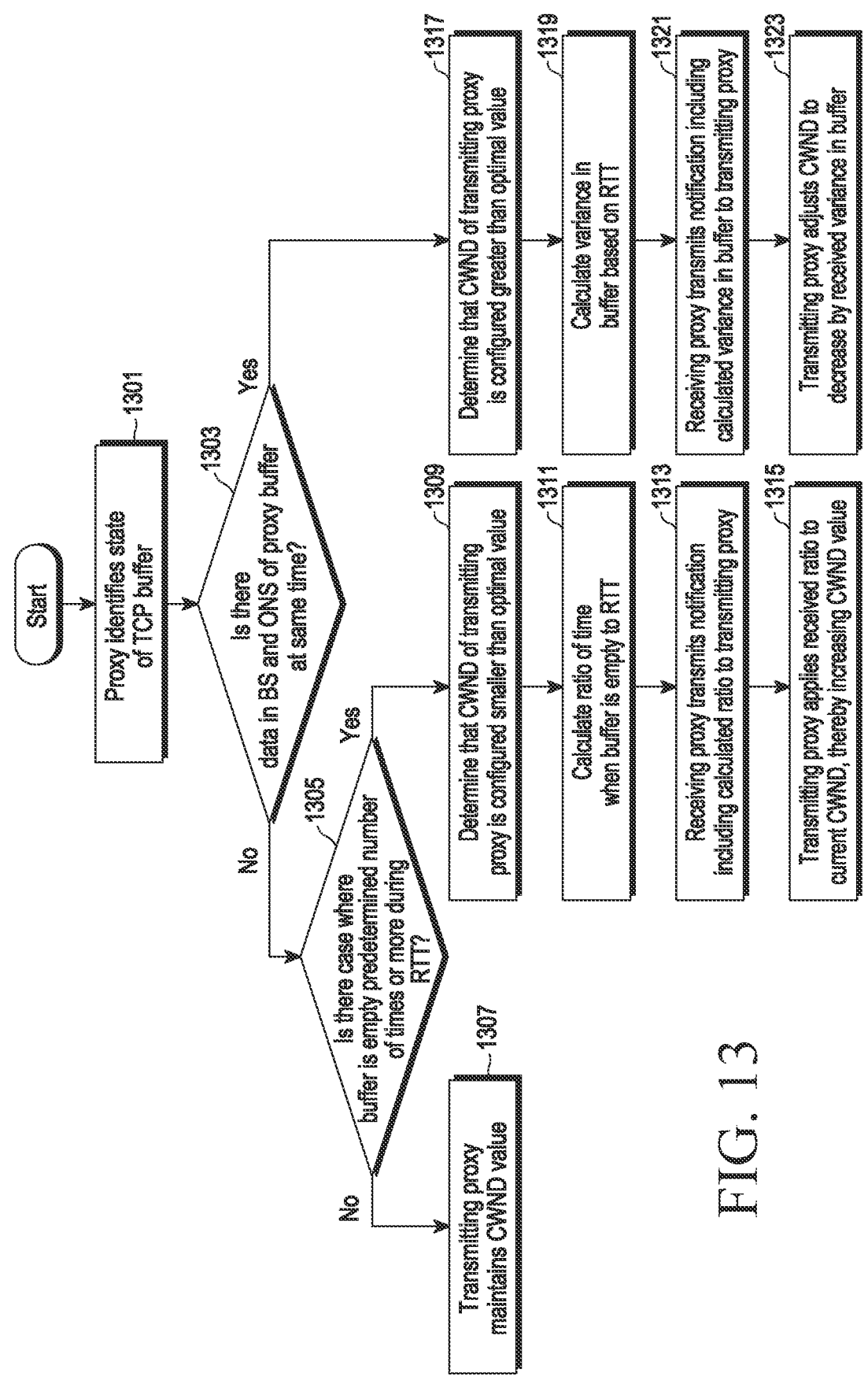
FIG. 13 illustrates a process of adjusting a CWND based on a proxy buffer amount according to an embodiment of the disclosure.

FIG. 13 illustrates a process of adjusting a CWND based on a proxy buffer amount according to an embodiment of the disclosure.

Referring to FIG. 13, a receiving proxy may identify a state of a TCP buffer in operation 1301, and may identify whether there is data in a BS and an ONS of a proxy buffer at the same time in operation 1303.

When there is no data in the BS and the ONS of the receiving proxy buffer at the same time in operation 1303, the receiving proxy may identify whether there is a case where the buffer is empty a predetermined number of times or more during an RTT in operation 1305.

When there is no case where the buffer is empty the predetermined number of times or more during the RTT in operation 1305, a transmitting proxy may maintain a CWND value in operation 1307.

When there is a case where the buffer is empty the predetermined number of times or more during the RTT in operation 1305, the receiving proxy may determine that a CWND of the transmitting proxy is configured smaller than an optimal value in operation 1309.

The receiving proxy may calculate a ratio of time when the buffer is empty to the RTT in operation 1311, and may transmit a notification including the calculated ratio to the transmitting proxy in operation 1313. In operation 1315, the transmitting proxy may apply the received ratio to the current CWND, thereby increasing the CWND value.

When there is data in the BS and the ONS of the receiving proxy buffer at the same time in operation 1303, the receiving proxy may determine that the CWND of the transmitting proxy is configured greater than the optimal value in operation 1317.

The receiving proxy may calculate a variance in the buffer based on the RTT in operation 1319, and may transmit a notification including the calculated variance in the buffer to the transmitting proxy in operation 1321. In operation 1323, the transmitting proxy may adjust the CWND value to decrease by the received variance in the buffer.

The disclosure proposes a TCP session freezing method based on handover information between a UE and a satellite. A UE proxy and a ground station proxy recognize a handover event of the UE, and freeze (or stop) a TCP session from when a handover starts to when the handover ends (here, a CWND value does not change and data transmission stops).

A method for the proxies to recognize start of the handover event is recognizing an exchange of handover-related RRC reconfiguration messages between the UE and the ground station, and a method for the proxies to recognize end of the handover event is exchanging handover-related RRC reconfiguration complete messages between the UE and the ground station, but includes exchanging handover triggering messages without being limited thereto.

In addition, due to mobility of the satellite, the handover may be performed by using time information or a predetermined timer for a time of the handover. Even in this case, it may be recognized that the handover is performed and terminated by using a timer or time information.

Figure 14:
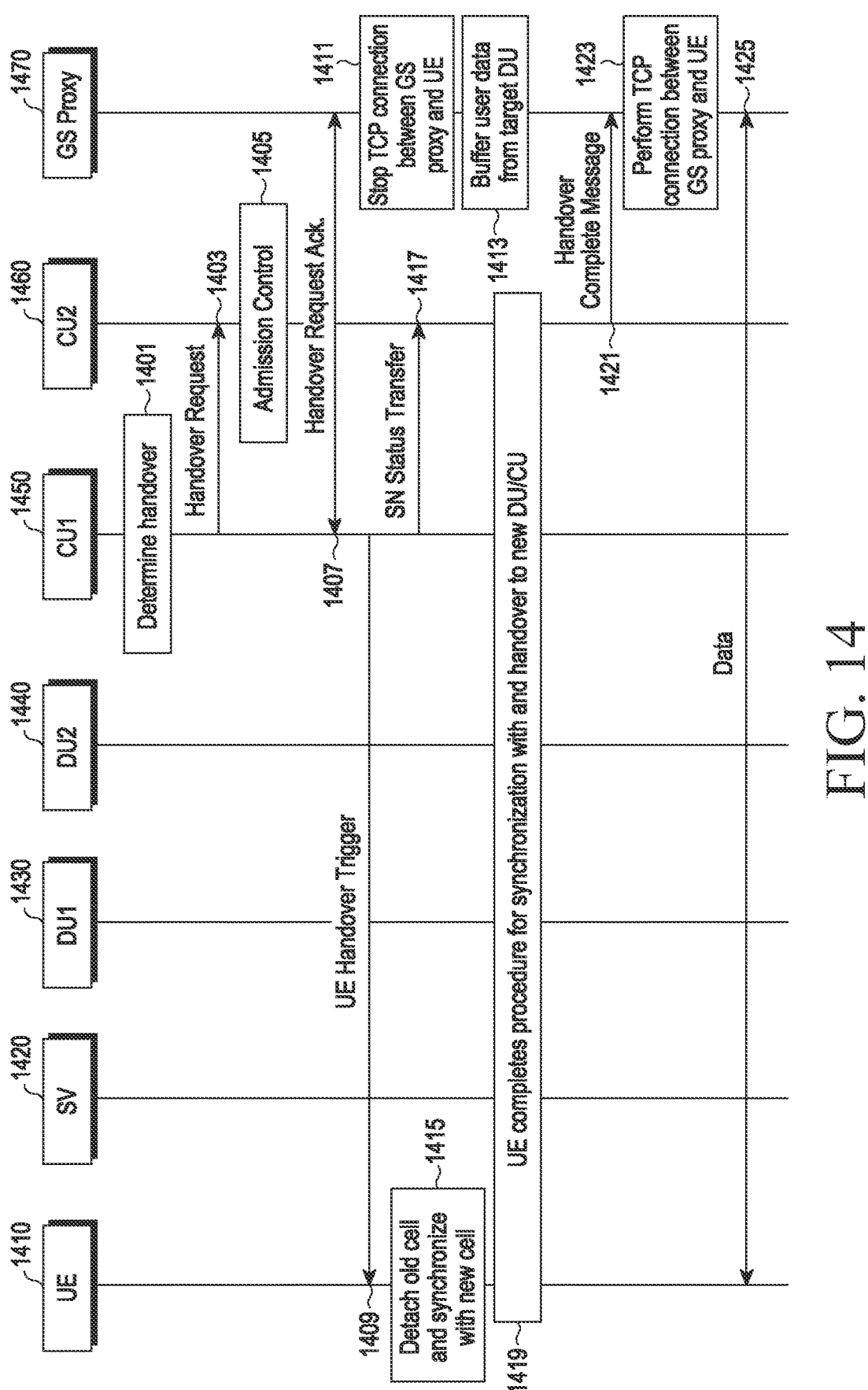
FIG. 14 illustrates a method of freezing a TCP session based on handover information between a UE and a satellite according to an embodiment of the disclosure.

FIG. 14 illustrates a method of freezing a TCP session based on handover information between a UE and a satellite according to an embodiment of the disclosure.

FIG. 14 proposes a method of freezing a TCP session based on handover information between a UE and a satellite in a single proxy structure.

Referring to FIG. 14, control unit 1 (CU1) 1450 may determine a handover in operation 1401, and may transmit a Handover Request message to CU2 1460 in operation 1403.

CU2 1460 may perform Admission Control in operation 1405, and may transmit a Handover Request Ack message to CU1 1450 and a GS proxy 1470 in operation 1407. Here, the GS proxy 1470 refers to the foregoing NTN proxy.

CU1 1450 may transmit a UE Handover Trigger to a UE 1410 in operation 1409, and the GS proxy 1470 may stop (or freeze) a TCP connection between the GS proxy 1470 and the UE 1400 in operation 1411. In operation 1413, the GS proxy 1470 may buffer user data from a target data unit (DU).

In operation 1415, the UE 1400 may detach an old cell, and may perform a procedure for synchronization with a new cell.

In operation 1417, CU1 1450 may transmit an SN Status Transfer to CU2 1460.

In operation 1419, the UE 100 may complete a procedure for synchronization with and handover to a new DU/CU (e.g., DU2/CU2).

CU2 1460 may transmit a Handover Complete message to the GS proxy 1470 in operation 1421, and the GS proxy 1470 may perform the TCP connection between the GS proxy 1470 and the UE 1400 in operation 1423. In operation 1425, the UE 1400 and the GS proxy 1470 may exchange data.

Figure 15:
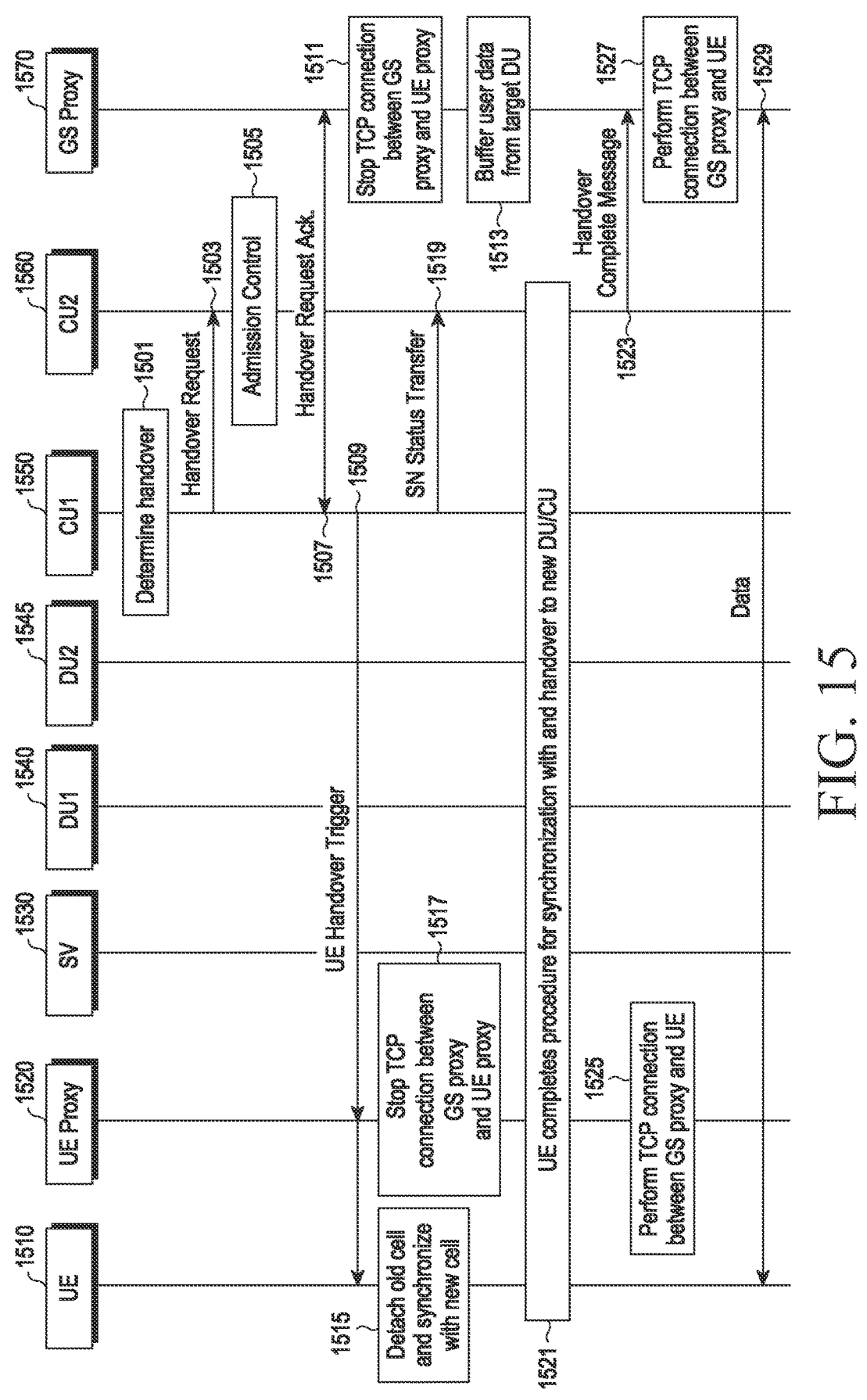
FIG. 15 illustrates a method of freezing a TCP session based on handover information between a UE and a satellite according to another embodiment of the disclosure.

FIG. 15 illustrates a method of freezing a TCP session based on handover information between a UE and a satellite according to another embodiment of the disclosure.

FIG. 15 proposes a method of freezing a TCP session based on handover information between a UE and a satellite in a paired proxy structure.

Referring to FIG. 15, control unit 1 (CU1) 1550 may determine a handover in operation 1501, and may transmit a Handover Request message to CU2 1560 in operation 1503.

CU2 1560 may perform Admission Control in operation 1505, and may transmit a Handover Request Ack message to CU1 1550 and a GS proxy 1570 in operation 1507. Here, the GS proxy 1570 refers to the foregoing NTN proxy.

CU1 1550 may transmit a UE Handover Trigger to a UE 1510 in operation 1509, and the GS proxy 1570 may stop (or freeze) a TCP connection between the GS proxy 1570 and a UE proxy 1520 in operation 1511. In operation 1513, the GS proxy 1570 may buffer user data from a target data unit (DU).

In operation 1515, the UE 1510 may detach an old cell, and may perform a procedure for synchronization with a new cell. In operation 1517, the UE proxy 1520 may stop (or freeze) the TCP connection between the GS proxy 1570 and the UE proxy 1520.

In operation 1519, CU1 1550 may transmit an SN Status Transfer to CU2 1560.

In operation 1521, the UE 1510 may complete a procedure for synchronization with and handover to a new DU/CU (e.g., DU2/CU2).

CU2 1560 may transmit a Handover Complete message to the GS proxy 1570 in operation 1523, and the UE proxy 1520 may perform the TCP connection between the GS proxy 1570 and the UE proxy 1520 in operation 1525.

In operation 1527, the GS proxy 1570 may perform the TCP connection between the GS proxy 1570 and the UE proxy 1520. In operation 1529, the UE 1510 and the GS proxy 1570 may exchange data.

The disclosure proposes an adaptive retransmission timeout (RTO) adjustment method based on retransmission information in satellite communication with a UE. Instability of a satellite link operates a retransmission technique, such as a hybrid automatic repeat request (HARQ) of a MAC layer and an automatic repeat request (ARQ) of an RLC layer among protocol layers prior to a TCP.

The disclosure proposes a method of temporarily increasing an RTO corresponding to a retransmitted packet, based on the number of retransmissions by an HARQ and an ARQ. When retransmission occurs by a retransmission mechanism, such as the HARQ or the ARQ, in a previous layer of a TCP layer, a proxy recognizes that the retransmission has occurred, and adjusts a currently configured RTO value only for a packet of which the retransmission has occurred.

Figure 16:
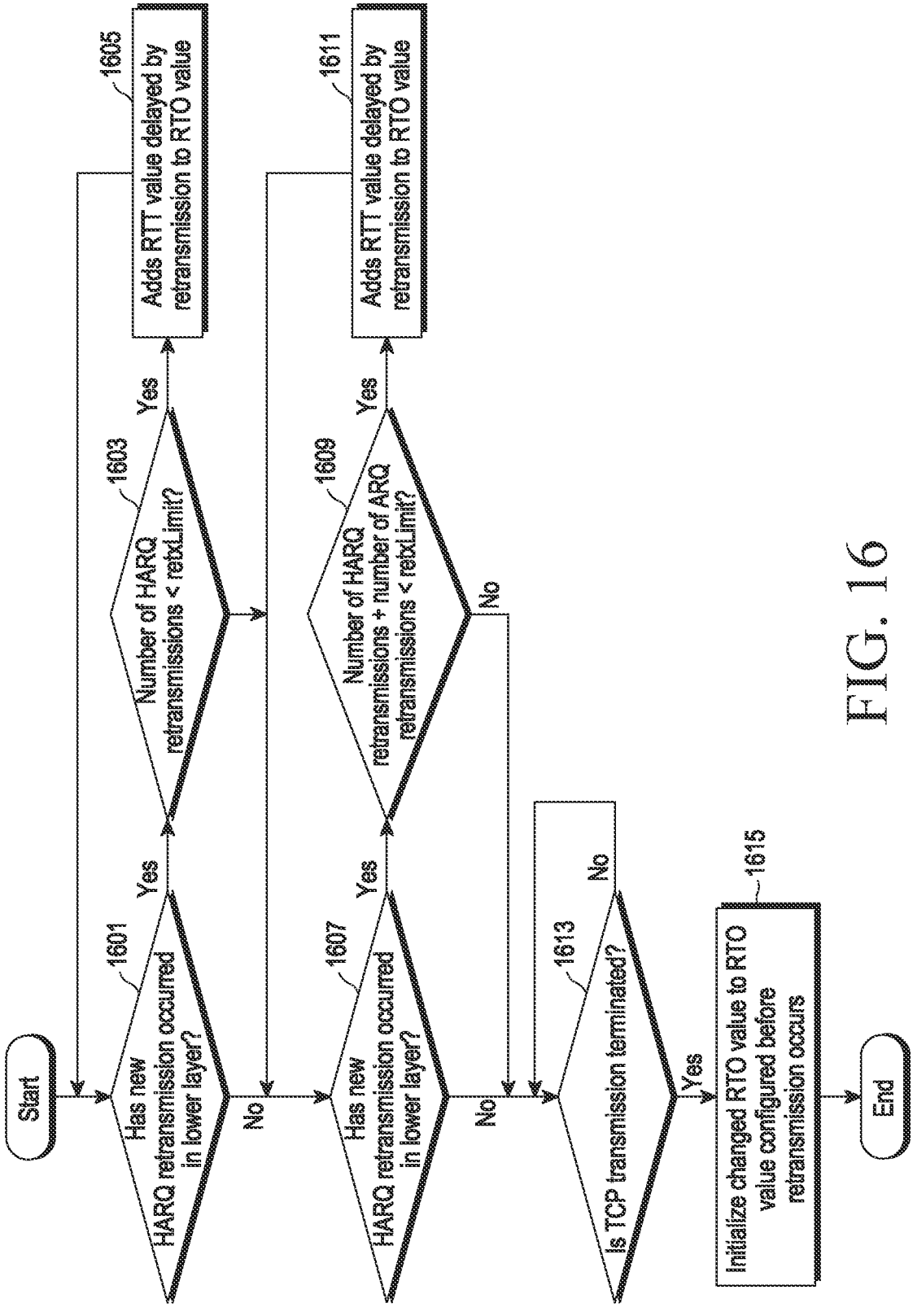
FIG. 16 illustrates an adaptive RTO adjustment method based on retransmission information in satellite communication with a UE according to an embodiment of the disclosure.

FIG. 16 illustrates an adaptive RTO adjustment method based on retransmission information in satellite communication with a UE according to an embodiment of the disclosure.

Referring to FIG. 16, in operation 1601, a proxy may determine whether new HARQ retransmission has occurred in a lower layer. When the new HARQ retransmission has occurred in the lower layer in operation 1601, the proxy may identify whether the number of HARQ retransmissions is less than a threshold "retxLimit" in operation 1603.

When the number of HARQ retransmissions is less than the threshold "retxLimit" in operation 1603, the proxy adds an RTT value delayed by the retransmission to an RTO value in operation 1605.

When no new HARQ retransmission has occurred in the lower layer in operation 1601, the proxy may determine whether new ARQ retransmission has occurred in the lower layer in operation 1607.

When the new ARQ retransmission has occurred in the lower layer in operation 1607, the proxy may identify whether "number of HARQ retransmissions+number of ARQ retransmissions" is less than the threshold value "retxLimit" in operation 1609.

When the "number of HARQ retransmissions+number of ARQ retransmissions" is less than the threshold value "retxLimit" in operation 1609, the proxy adds an RTT value delayed by the retransmission to the RTO value in operation 1611.

When no new ARQ retransmission has occurred in the lower layer in operation 1607, the proxy may determine whether to terminate transmission of a corresponding TCP in operation 1613.

When the proxy determines to terminate the transmission of the TCP in operation 1613, the proxy may initialize the changed RTO value to the RTO value configured before the retransmission occurs in operation 1615.

When receiving data, the proxy monitors whether retransmissions occurs. Whenever data is retransmitted in a MAC layer or an RLC layer, the proxy adds an RTT value delayed due to retransmission to a current RTO value.

For example, when HARQ retransmission occurs once in the MAC layer, a receiving proxy adds an RTT value to the RTO value. When an ARQ additionally occurs in the RLC layer, the receiving proxy adds an RTT value to the RTO value previously changed to RTO+RTT. As a result, the RTO value is finally changed as follows in a TCP layer.

$$RTO_{ref}=RTO+(RTT\times(nrofHARQ+nrofARQ))$$

$$RTO_{new}=min(RTO_{ref},RTO+(RTT\times retxLimit))$$
Equation 6

In Equation 6, RTOnew is a new RTO reflecting the number of retransmissions, nrofHARQ is the number of HARQ retransmissions, nrofARQ is the number of ARQ retransmissions, RTT is an RTT value measured between a UE and a ground station or an RTT value calculated through coordinates, and retxLimit is the maximum allowable number of retransmissions determined by the proxy, which is a constant for preventing an RTO from being too long.

Since a new RTO value is applied per packet, a packet that is not retransmitted uses an existing RTO value, and an RTO value is calculated by using the same equation as used in an existing TCP.

Figure 17:
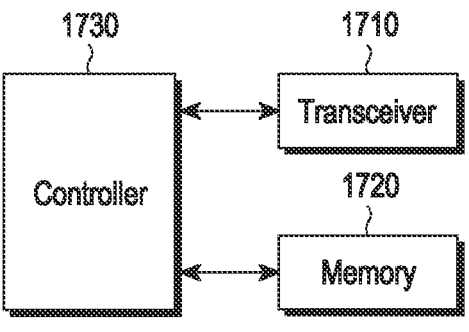
FIG. 17 illustrates a structure of a proxy device according to an embodiment of the disclosure.

FIG. 17 illustrates a structure of a proxy device according to an embodiment of the disclosure.

The proxies described with reference to FIG. 1 to FIG. 16 may correspond to the proxy device of FIG. 17.

According to an embodiment, when the proxy device is configured as a single proxy in a mobile communication system, the proxy device may be configured in any one of the UE, the satellite, a ground station, and a core network.

According to another embodiment, when the proxy device is configured as a paired proxy in a mobile communication system, a first proxy may be configured in the UE, and a second proxy may be configured in any one of the satellite, a ground station, and a core network.

Referring to FIG. 17, the proxy device may include a transceiver 1710, a memory 1720, and a controller 1730.

According to the foregoing communication method of the proxy device, the transceiver 1710, the controller 1730, and the memory 1720 of the proxy device may operate. However, components of the proxy device are not limited to the above examples. For example, the proxy device may include more or fewer components than those described above. The transceiver 1710, the controller 1730, and the memory 1720 may be configured as a single chip. The controller 1730 may include one or more processors.

The transceiver 1710 collectively refers to a receiver of the proxy device and a transmitter of the proxy device, and may transmit or receive a signal to or from another device. To this end, the transceiver 1710 may include an RF transmitter that upconverts and amplify a frequency of a transmitted signal and an RF receiver that performs low-noise amplification on a received signal and downconverts a frequency thereof. However, this configuration is only one embodiment of the transceiver 1710, and components of the transceiver 1710 are not limited to the RF transmitter and the RF receiver.

The transceiver 1710 may receive a signal through a radio channel to output the signal to the controller 1730, and may transmit a signal output from the controller 1730 through the radio channel.

The memory 1720 may store a program and data necessary for an operation of the proxy device. The memory 1720 may also store control information or data included in a signal obtained from the proxy device. The memory 1720 may be configured as a storage medium, such as a ROM, a RAM, a hard disk, a CD-ROM, and a DVD, or a combination of storage media. The memory 1720 may not exist separately but may be included in the controller 1730.

The controller 1730 may control a series of processes so that a UE may operate according to the foregoing embodiments of the disclosure.

The controller 1730 may obtain configuration information about a satellite cell connected with a UE for which a transport control protocol (TCP) session is established from a server that manages a satellite, may calculate a first round trip time (RTT) between the satellite cell and the satellite and a data rate of the satellite cell, based on the configuration information about the satellite cell, and may configure a congestion window (CWND) value for the TCP session, based on the first RTT and the data rate of the satellite cell.

The controller 1730 may generate an RTT map between the satellite and the satellite cell and a data rate map between the satellite and the satellite cell, based on the configuration information about the satellite cell.

The controller 1730 may calculate a distance between a center of the satellite cell and the satellite, based on an altitude of the satellite, an elevation angle of the satellite, and configuration information about a spot beam forming the satellite cell that are included in the configuration information about the satellite cell, and may calculate the first RTT, based on the distance between the center of the satellite cell and the satellite and a speed of light.

The controller 1730 may identify a state of a TCP buffer of the proxy device, and may determine whether a CWND value of a transmitting proxy needs to be adjusted, based on the state of the TCP buffer.

The controller 1730 may determine that the CWND value of the transmitting proxy is smaller than an optimal value, based on the state of the TCP buffer, may calculate a ratio of time when the buffer is empty to the RTT, and may perform control to transmit a first notification message including the ratio of time when the buffer is empty to the RTT to the transmitting proxy so that the CWND value of the transmitting proxy is adjusted to increase.

The controller 1730 may determine that the CWND value of the transmitting proxy is greater than the optimal value, based on the state of the TCP buffer, may calculate a variance in the buffer based on the RTT, and may perform control to transmit a second notification message including the variance in the buffer based on the RTT to the transmitting proxy so that the CWND value of the transmitting proxy is adjusted to decrease.

The controller 1730 may perform control to receive a handover-related message, and may freeze the TCP session during a handover.

The controller 1730 may identify whether hybrid automatic repeat request (HARQ) or automatic repeat request (ARQ) retransmission has occurred in a lower layer, and may adjust a retransmission timeout (RTO) value, based on the number of HARQ retransmissions or ARQ retransmissions.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, it will be apparent that various modifications and changes may be made thereto without departing from the scope of the disclosure. Therefore, the scope of the disclosure should not be defined as being limited to the embodiments, but should be defined by the appended claims and equivalents thereof.

The invention claimed is:

1. An operating method of a proxy in a mobile communication system in which a terrestrial network and a satellite network are combined, the method comprising:
obtaining configuration information about a satellite cell connected with a UE for which a transport control protocol (TCP) session is established from a server that manages a satellite, wherein the configuration information about the satellite cell includes an altitude of the satellite, an elevation angle of the satellite, and configuration information about a spot beam forming the satellite cell;

calculating a first round trip time (RTT) between the satellite cell and the satellite and a data rate of the satellite cell, based on the configuration information about the satellite cell; and
configuring a congestion window (CWND) value for the TCP session, based on the first RTT and the data rate of the satellite cell.

2. The method of claim 1, further comprising generating an RTT map between the satellite and the satellite cell and a data rate map between the satellite and the satellite cell, based on the configuration information about the satellite cell.

3. The method of claim 1, further comprising:
calculating a distance between a center of the satellite cell and the satellite, based on the configuration information about the satellite cell; and
calculating the first RTT, based on the distance between the center of the satellite cell and the satellite and a speed of light.

4. The method of claim 1, wherein in case that the proxy is configured as a single proxy in the mobile communication system, the proxy is configured in any one of the UE, the satellite, a ground station, and a core network.

5. The method of claim 1, wherein in case that the proxy is configured as a paired proxy in the mobile communication system, a first proxy is configured in the UE, and a second proxy is configured in any one of the satellite, a ground station, and a core network.

6. The method of claim 1, further comprising:
identifying a state of a TCP buffer of the proxy; and
determining whether a CWND value of a transmitting proxy needs to be adjusted, based on the state of the TCP buffer.

7. The method of claim 6, comprising:
determining that the CWND value of the transmitting proxy needs to be adjusted to increase, based on the state of the TCP buffer;
calculating a ratio of time in case that the TCP buffer is empty to the RTT; and
transmitting a first notification message comprising the ratio of time in case that the TCP buffer is empty to the RTT to the transmitting proxy so that the CWND value of the transmitting proxy is adjusted to increase.

8. The method of claim 6, comprising:
determining that the CWND value of the transmitting proxy needs to be adjusted to decrease, based on the state of the TCP buffer;
calculating a variance in the TCP buffer based on the RTT; and
transmitting a second notification message comprising the variance in the TCP buffer based on the RTT to the transmitting proxy so that the CWND value of the transmitting proxy is adjusted to decrease.

9. The method of claim 1, comprising:
receiving a handover-related message; and
freezing the TCP session during a handover.

10. The method of claim 1, comprising:
identifying whether hybrid automatic repeat request (HARQ) or automatic repeat request (ARQ) retransmission occurs in a lower layer; and
adjusting a retransmission timeout (RTO) value, based on a number of HARQ retransmissions or ARQ retransmissions.

11. A proxy device in a mobile communication system in which a terrestrial network and a satellite network are combined, the proxy device comprising:
a transceiver; and a controller connected with the transceiver to control the transceiver, and configured to:

obtain configuration information about a satellite cell connected with a UE for which a transport control protocol (TCP) session is established from a server that manages a satellite, wherein the configuration information about the satellite cell includes an altitude of the satellite, an elevation angle of the satellite, and configuration information about a spot beam forming the satellite cell, calculate a first round trip time (RTT) between the satellite cell and the satellite and a data rate of the satellite cell, based on the configuration information about the satellite cell, and configure a congestion window (CWND) value for the TCP session, based on the first RTT and the data rate of the satellite cell.

12. The proxy device of claim 11, wherein the controller is configured to generate an RTT map between the satellite and the satellite cell and a data rate map between the satellite and the satellite cell, based on the configuration information about the satellite cell.

13. The proxy device of claim 11, wherein the controller is configured to:

calculate a distance between a center of the satellite cell and the satellite, based on the configuration information about the satellite cell; and calculate the first RTT, based on the distance between the center of the satellite cell and the satellite and a speed of light.

14. The proxy device of claim 11, wherein in case that the proxy device is configured as a single proxy in the mobile communication system, the proxy device is configured in any one of the UE, the satellite, a ground station, and a core network.

15. The proxy device of claim 11, wherein in case that the proxy device is configured as a paired proxy in the mobile communication system, a first proxy is configured in the UE, and a second proxy is configured in any one of the satellite, a ground station, and a core network.

* * * * *